PARAMETRIC SUBHARMONIC OSCILLATOR

Filed Sept. 21, 1960

INVENTORS
ARTHUR W. LO &
BY JAMES C. MILLER
John V. Regan
ATTORNEY

INVENTORS
ARTHUR W. LO &
JAMES C. MILLER
BY John V. Regan
ATTORNEY

United States Patent Office 3,351,771
Patented Nov. 7, 1967

3,351,771
PARAMETRIC SUBHARMONIC OSCILLATOR

James C. Miller, Hamilton Square, N.J., and Arthur W. Lo, Poughkeepsie, N.Y., assignors to Radio Corporation of America, a corporation of Delaware
Filed Sept. 21, 1960, Ser. No. 57,474
14 Claims. (Cl. 307—88)

This invention relates to parametric subharmonic oscillators and, more particularly, to parametric subharmonic oscillators employing variable inductance elements.

Parametric subharmonic oscillators, their characteristics and mode of operation have been described in various publications. It has been suggested that ferrite cores be used as variable inductance elements in such oscillators. However advantageous the use of cores may be in some applications, the maximum operating frequency of such elements is limited to a relatively low value to prevent overheating of the cores. The obtainable frequency may be increased by reducing the size of the cores. However, a practical limit of size reduction is reached at which it becomes difficult and expensive to wind the input and output windings on the cores.

Accordingly, it is an object of this invention to provide improved parametric subharmonic oscillators employing variable inductance elements.

It is another object of this invention to provide improved parametric subharmonic oscillators which employ variable inductance elements and which have a higher operating frequency than known parametric subharmonic oscillators employing variable inductance elements.

It is still another object of this invention to provide parametric subharmonic oscillators employing variable inductance elements which have small hysteresis and eddy current losses.

It is yet another object of this invention to provide parametric subharmonic oscillators employing variable inductance elements which are simple in construction and inexpensive.

These and other objects of the invention are accomplished by a thin member of high permeability material having an open flux path, an output winding and an input winding linking said member, means for applying alternating current (A.C.) energizing signals of frequency $f$ to said input winding, and means connected with said output winding to form a circuit resonant at a subharmonic of said frequency $f$.

Figure 1:
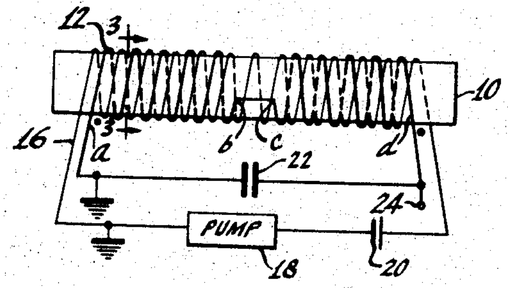
FIGURE 1 is a schematic diagram of one embodiment of the invention, wherein the variable inductance element is a thin, planor strip of high permeability material.

A parametric subharmonic oscillator consists essentially of a tank circuit having a natural resonant frequency $f_0$. If one of the reactances in the tank circuit is varied at a frequency $f$ by an alternating current signal from an energizing source, often referred to as the "pump," an effective negative conductance appears across the tank circuit. If the frequency at which the reactance is varied bears a certain relationship to the natural resonant frequency $f_0$, oscillations build up parametrically in the tank circuit and are sustained so long as the amplitude of the energizing signal exceeds a certain critical value. Parametric oscillations, as is known, may be sustained at various subharmonics integrally related to the pump frequency, and the phase of oscillations is locked in a certain relation to that of the energizing signal.

In particular, the tank circuit may be adjusted to oscillate parametrically at one-half the pump frequency in a binary system, whereby parametric oscillations are sustained in either of two distinct and stable phases. The two phases are 180° apart at the same frequency and may represent, respectively, binary "one" and binary "zero." Once the tank circuit starts to oscillate in either of the two stable phases, it continues to do so until forcibly stopped or until the pump signal is interrupted. The oscillations may be steered initially into a desired one of the two phases by applying a small locking signal at the oscillating frequency to the tank circuit during, or slightly prior to, the time that oscillations first start to build up. A more detailed description of the physical and operating properties of parametric oscillators are given in an article entitled, "Parametric Phase Locked Oscillator—Characteristics and Applications to Digital Systems," in the September 1959 issue of of the IRE Transactions of Electronic Computers at pp. 282–283, and in other publications. For descriptive purposes, such oscillators are referred to hereinafter as "phase locked oscillators" or "PLO's."

It has been suggested that the variable reactor of a PLO take the form of two ferrite cores. Such cores are characterized by low leakage flux and low eddy current losses. However, cores have a large ratio of volume-to-surface area with resulting low heat dissipation. The heat generated in a core is a function of the operating frequency. As is known, the magnetic properties of a magnetic material change drastically in the region of the Curie point, and the temperature of the material must not reach a value at which such changes set in. Artificial cooling is sometimes used to permit higher operating frequencies for magnetic cores. However, the maximum operating frequency for a given environment of a core must be limited to a relatively low value to avoid overheating.

In general, the upper frequency limit of a PLO employing ferrite cores may be increased by decreasing the size of the cores. This also implies a decrease in the size of the core apertures. A practical limit of small core size is reached below which it becomes difficult to thread the necessary windings through the small aperture. Moreover, cores of such small size are generally hand wound, which becomes expensive in an application where numerous cores are required, such as in modern information handling systems.

The oscillating frequency of a phase locked oscillator may be greatly increased in accordance with the present invention by employing a variable inductance element in the form of a thin member, such as a strip, film and the like, of high permeability material. By "high permeability" is meant, for example, a specific permeability of 30,000 or higher. A desired material is one also possessing a low coercive force, for example less than one oersted, and having a non-linear B–H characteristic of the linear or "S" type, in any event, having a low area hysteresis loop.

It will be recognized that the above-mentioned characteristics are those possessed by some metallic alloys. One suitable and preferred material for use in practicing the invention is of the class known in the art as 4–79 molybdenum permalloy. The decision to use a metallic alloy in place of ferrite essentially means the substitution of high permeability, low resistance material for a low permeability, high resistance material. The low resistance of the alloy is balanced by the use of a very thin geometry. By "thin" is meant less than one mil, and in practice the material is made as thin as possible consistent with structural stability. A very thin member of such material has low hysteresis losses because of the small volume and also low eddy current losses. Heating of the material is small in a thin member because of the high surface-to-volume ratio, permitting high frequency operation.

One embodiment of an improved PLO according to the invention is illustrated in FIGURE 1. The PLO comprises a thin strip 10 of high permeability material having the general characteristics aforementioned. An output winding 12 is wound around the strip 10 in two sections. The first section *a–b* is wound clockwise around the strip 10, as viewed in the drawing from the right end of the strip 10. The second section *c–d* is wound counterclockwise around the strip 10 for reasons which will be explained more fully hereinafter. An input winding 16, illustrated by thinner lines than the output winding 12 for clarity of drawing, is also wound around the strip 10. The input winding 16 is connected to a pump energizing source 18 through a D.C. biasing source, illustrated as a battery 20. The output winding 12 is connected in circuit with a capacitor 22 to form a resonant tank circuit.

The pump 18 may be any suitable A.C. signal source such as a triode oscillator. The inductance of the output winding 12 is varied at the frequency of the A.C. signals from the pump 18, because of the non-linear magnetic properties of the strip 10. The value of the capacitor 22 is selected such that the tank circuit has a natural resonant frequency at, or close to, a subharmonic of the A.C. pump frequency. The first subharmonic is preferred in a binary system. Parametric oscillations build up in the tank circuit at the selected subharmonic in response to a negative conductance presented to the tank circuit by the varying inductance. In addition, the A.C. pump signal of frequency $f$ is coupled to the output winding 12 by transformer action. The output winding 12 is wound in two series-opposed sections, as indicated by the conventional dot markings in the drawing, to provide cancellation of the voltage induced in the output winding at the fundamental frequency $f$. Of course cancellation may also be achieved by winding the input winding 16 in two series-opposed sections and winding the output winding 12 in one direction only. It will be understood that this also applies to the other embodiments to be described and is within the purview of the invention. Either method of winding prevents a voltage of the fundamental frequency from appearing across the tank circuit. An output from the tank circuit may be derived across the capacitor 22 by connecting an output terminal 24 on one side of the capacitor 22 and grounding the other side of the capacitor.

It will be recognized that a portion of the flux path for the windings 12, 16 is external to the strip 10, that is to say, through the air. As is known, air has a high reluctance to magnetic flux. This high reluctance is offset, however, by the high permeability of the strip 10, and a large change in inductance is provided in response to the A.C. pump signals. For maximum efficiency and minimum power requirements, the strip 10 is one having an easy direction of magnetization along a path between the ends of the strip 10, substantially parallel to the flux axis of the windings 12, 16.

Figure 2:
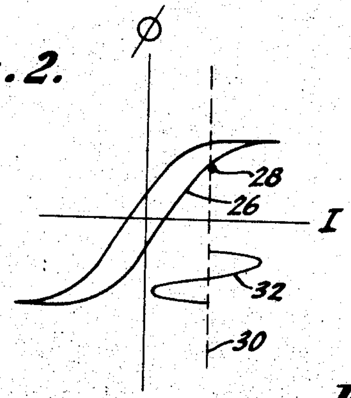
FIGURE 2 is a typical $\phi$–I characteristic of a suitable high permeability material for use in practicing the invention.

A typical $\phi$–I characteristic curve for a suitable high permeability material is illustrated in FIGURE 2. The material has preferably a low area hysteresis loop, as illustrated in the drawing. The build-up time of parametric oscillations in the tank circuit of FIGURE 1 is a function of the percent change in inductance occasioned by the pump signal. It is desirable, therefore, that the strip 10 be biased to an optimum point of non-linearity, as indicated by the point 28 of intersection of the dashed vertical line 30 with the characteristic curve 26 in FIGURE 2. The strip 10 operates along a minor hysteresis loop in response to pump signals 32.

Figure 3:
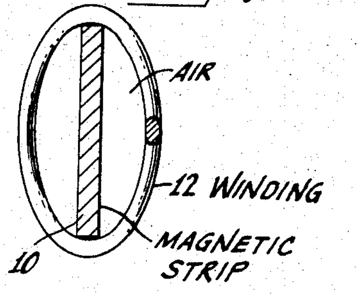
FIGURE 3 is a sectional view taken along the line 3–3 of FIGURE 1 and useful in explaining "area factor" phenomenon.

A further factor which determines the efficiency of the PLO is the area factor of the variable inductance element, which may best be described with reference to FIGURE 3. FIGURE 3 is a sectional view of the strip 10 and the output winding 12 taken along the line 3—3 of FIGURE 1. The inductance of the output winding essentially is composed of two parts:

$$L = L_{\text{air}} + L_{\text{metal}}$$

$L_{\text{air}}$ represents the contribution of all portions of the cross section which are not occupied by the magnetic material, and $L_{\text{metal}}$ is the component of inductance due to the magnetic material itself. To obtain maximum variation in inductance, $L_{\text{air}}$, the fixed portion, should be smaller than $L_{\text{metal}}$. The inductance of the output winding 12 is then approximately equal to the inductance of the metal, and full advantage may then be taken of the non-linearity in the slope of the B–H curve of the strip 10. The area factor may be defined as the ratio of the cross sectional area of the magnetic strip 10 to the area of the air between the output winding 12 and the strip 10. A good area factor corresponds to a high value of $\Delta L/L$ and, hence, to a fast build-up of parametric oscillations, where $\Delta L$ is the range of inductance variation and L is the fixed inductance due to air.

The area factor for the device of FIGURE 1 may be increased by reducing the air space between the output winding 12 and the strip 10. One method of accomplishing this objective is to use printed circuit techniques for establishing the output winding 12. Depending upon the thickness of the strip 10, it may be necessary in order to maintain structural stability of the strip 10 to form an insulating sandwich by placing the strip 10 on or between thin insulating sheets, or to coat the strip 10 with a suitable substance such as lacquer. The output winding 12 (and input winding 16) may be established by printed circuit techniques in accordance with the method described in a copending application of C. W. Henderson, entitled, "Method of Making Electrical Conductors," Ser. No. 804,018, filed Apr. 3, 1959, and now U.S. Patent No. 3,159,486 and assigned to the assignee of the present invention. It will be recognized that the problem of threading windings through a small aperture, and the expense thereof, has been eliminated in the FIGURE 1 apparatus.

Figure 4:
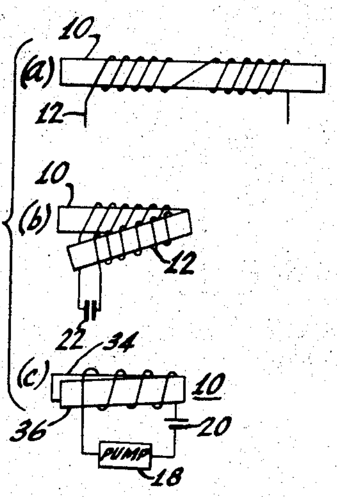
FIGURE 4 is another embodiment of the invention wherein the thin strip of high permeability material is folded end-to-end.

Another embodiment of the invention is illustrated in FIGURE 4. An output winding 12 is wound on a thin strip 10 of high permeability material. The winding 12 is in two sections, both wound in the same sense, i.e. beginning at the left end of the strip 10, the sections are wound clockwise. The strip 10 is then folded (FIGURE 4*b*) at a point between the two sections of output winding 12. A capacitor 22 is connected across the ends of the output winding 12 to form a resonant tank.

After the strip 10 has been bent or folded, an input winding 16 is wound around the two legs 34, 36 of the strip 10, as illustrated in FIGURE 4*c*. The output winding 12 is not shown in FIGURE 4*c* for clarity of drawing. It may be seen, however, that the two sections of output winding 12 are wound series-opposed with respect to the input winding 16. For this reason, no net voltage at the pump frequency appears across the tank circuit. The input winding 16 is energized by A.C. pump signals from a pump 18. A battery 20 biases the strip 10 to an optimum operating point as described in connection with FIGURE 2.

Figure 5:
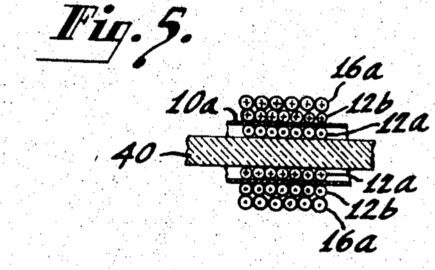
FIGURE 5 is still another embodiment of the invention using a tubular support member.

Another suitable variable inductance element is illustrated in cross-section in FIGURE 5. A tube 40 of insulating material, such as ceramic, serves as a frame for the input and output windings. A first section 12 of output winding is wound in one sense, i.e. clockwise around the tube 40. A thin ribbon of strip 10*a* of high permeability material is then placed over the winding 12*a* so as to cover the outer surface of the winding 12*a*. The preferred axis of magnetization of the high permeability material 10*a* is parallel to the axis of the tube 40. A second section 12*b* of output winding is then wound in the opposite sense, i.e. counterclockwise around the ribbon 10*a* to complete the output winding. The input winding 16*a* is wound around the outside of the second section 12*b* of output winding. Because of the particular geometry, the effective core of the output winding is the space between the two sections 12*a*, 12*b* of the output winding. This space consists essentially of magnetic material and a good area factor is thereby provided. Connections to the output winding 16*a* and input winding 12*a*, 12*b* may be made as illustrated in FIGURE 1.

Figure 6:
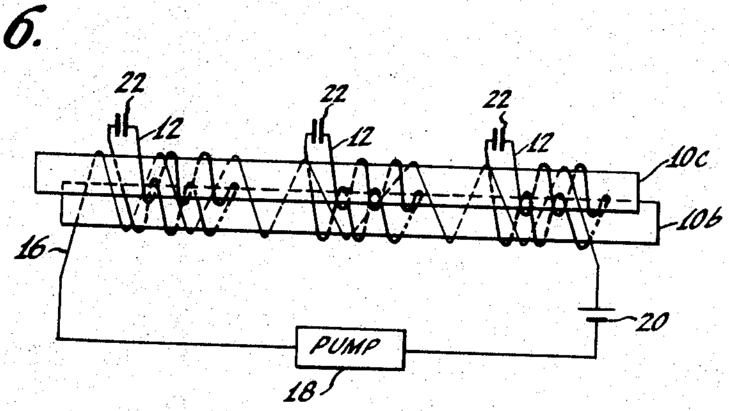
FIGURE 6 is an embodiment of the invention wherein separate thin strips of high permeability material are provided, one for each section of output winding.

An alternative arrangement of the FIGURE 4 embodiment is illustrated diagrammatically in FIGURE 6. The device differs from that of FIGURE 4 in that the single thin member, or strip, 10 bent end-to-end is replaced by two separate strips 10*b*, 10*c* parallel to each other. This particular construction has the advantage that the sensitive magnetic material is not bent, thereby preventing the possibility of deterioration in magnetic characteristics due to bending. A further advantage of the FIGURE 6 device is that many output windings may link the same strips.

Three separate tank circuits energized from a common pump 18 are illustrated in FIGURE 6. Each of the output windings 12 has a first section wound around the strip 10*a* and a second section wound around the other strip 10*b*. The input winding 16, illustrated by thinner lines than the output windings for clarity, is common to all of the tank circuits. The two sections of each output winding 12 are wound in series-opposition to provide cancellation of the voltages induced in the two sections at the pump frequency. Although the two strips 10*a*, 10*b* are illustrated as being separated from each other, it will be understood that this showning is for illustrative purposes only and that, in actual practice, the strips 10*a*, 10*b* are placed as close to each other as possible.

Figures 7, 8:
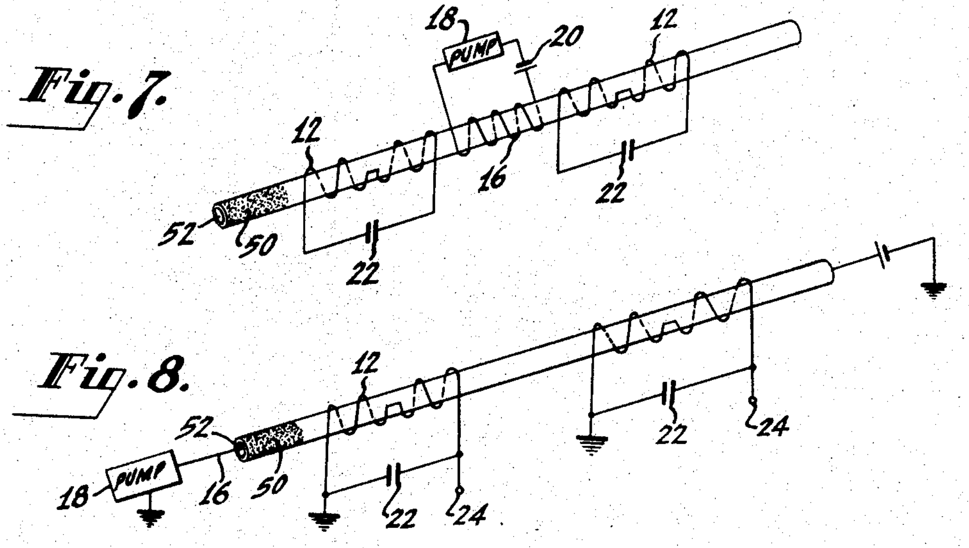
FIGURE 7 is an embodiment of the invention wherein the variable inductor comprises a thin tubular film of high permeability material having windings thereon.
FIGURE 8 is an embodiment of the invention using a hollow tubular member with the input winding threading the hollow member.

FIGURE 7 illustrates another embodiment of a PLO according to the present invention. The variable inductor of this embodiment comprises a thin tubular member of high permeability material in the form of a thin film 50 carried on the outer surface of a tube 52 of insulating material. The tube 52 may be, for example, a hollow ceramic cylinder. The term "thin film," as it is used here, has the usual connotation familiar to those skilled in the art, being generally defined as 10,000 angstroms or less. The thin film 50 of high permeability material may be electrodeposited or evaporated on the surface of the tube 52 by known techniques. The film 52 preferably has an easy direction of magnetization parallel to the axis of the tube 52. This easy direction of magnetization may be provided by establishing the thin film 50 on the tube 52 in the presence of a magnetic field.

Two separate, axially spaced PLO's are illustrated in FIGURE 7. Each of the tank circuits comprises an output winding 12 having a first portion wound clockwise around the tube 52 and a second section wound counterclockwise around the tube for cancellation purposes described hereinabove. A separate capacitor 22 is connected to each output winding 12 to provide a resonant tank circuit. The output windings 12 may be established by printed circuit techniques to provide an excellent area factor. The input winding 16 also may be established by printed circuit techniques. Input winding 16 is illustrated as being axially spaced from the input windings 12 for convenience of drawing. It will be understood, however, that in practice the output winding 16 physically links each of the output windings 12 as well as the thin film 50.

Another embodiment of the present invention is illustrated in FIGURE 8. This embodiment is generally similar to that of FIGURE 7. In FIGURE 8, however, the input winding 16 carrying the A.C. energizing signal from the pump 18 is threaded through the hollow of the tube 52. This embodiment has the advantage that winding of the input line 16 is eliminated. The output windings 12 link the film 50 such that their flux axes are substantially parallel to the easy direction of magnetization of the film 50.

The embodiments of FIGURES 1 and 6–8 are particularly well-suited for mass production. The variable inductors may be produced on long strips and windings wound thereon by printed circuit techniques. Thereafter, elements may be cut from the long strip as required. A structure comprising a long strip or film with several PLO windings thereon may be physically small in size and eliminates the problem of supporting or mounting the PLO's individually.

What has been described are several embodiments of improved phase locked oscillators employing variable inductance elements. These improved PLO's have a higher operating frequency than variable inductance PLO's of the prior art and are less expensive and less difficult to manufacture. Because of the thin strip or film geometry of high permeability material, these devices have low hysteresis loss, low eddy current loss, and high heat dissipation.

What is claimed is:

1. The combination comprising: a hollow, tubular thin film of high permeability material having an easy direction of magnetization; first and second conductors magnetically linking said film, one of said conductors being threaded through said hollow film; means connected to one of said conductors to form a circuit having a natural resonant frequency $f_0 \cong f$; and means for applying A.C. energizing signals having a frequency $nf$ to the other of said conductors where $n$ is an integer.

2. A parametric circuit comprising, in combination: a hollow, tubular thin film of high permeability material having a direction of easy magnetization and having a non-linear B–H characterstic; a conductor threaded through said hollow film; a winding having two sections wound in opposite sense around said film; means connected to said winding to form a resonant circuit; and means for applying to said conductor A.C. signals of sufficient amplitude to vary the inductance of said resonant circuit.

3. A parametric circuit comprising, in combination: a hollow, tubular thin film of high permeability material having a direction of easy magnetization and having a non-linear B–H characteristic; a conductor threaded through said hollow film and insulated from said material; a winding having two sections linking said film in opposite sense to one another; means for applying to said conductor A.C. signals having a frequency $f$; and means connected to said winding to form a circuit resonant at a frequency $f/n$, where $n$ is an integer.

4. The combination comprising a hollow, thin tubular film of high permeability material having an axis and having a direction of easy magnetization; a plurality of separate, axially spaced windings linking said film, each of said windings having a first section linking said film in one sense and a second section linking said film in the opposite sense; means connected with said windings to form a like plurality of resonant circuits; an input winding threaded through said hollow film; and means for applying energizing signals to said input winding.

5. The combination comprising: an elongated, thin strip of high permeability material having a direction of easy magnetization and bent to provide two juxtaposed legs; a first winding physically linking both of said legs; a second winding having a first section linking one of said legs in the same sense as said first winding and a second section linking the other of said legs in a sense opposite said first winding; and means connecting said second winding in a resonant circuit.

6. The combination comprising: a hollow tube; a thin film of high permeability material on said tube having a direction of easy magnetization, said material having a non-linear B–H characteristic; biasing means for applying a constant magnetic field to said material for biasing said material to a non-linear portion of said characteristic; first and second conductors magnetically linking said film, one of said conductors being threaded through said hollow film; means connected to one of said conductors to form a circuit which has a natural frequency $f_0 \cong f$; and means for applying A.C. signals having a frequency $nf$ to the other of said conductors, where $n$ is an integer.

7. A parametric circuit comprising, in combination: a hollow, tubular thin film of high permeability material having a direction of easy magnetization and having a non-linear B–H characteristic; biasing means for applying a constant magnetic field to said material for biasing said material to a nonlinear portion of said characteristic; a conductor threaded through said hollow film; a winding having two sections wound in opposite sense around said film; means connected to said winding to form a resonant circuit; and means for applying to said conductor A.C. signals of sufficient amplitude to vary the inductance of said resonant circuit.

8. A parametric circuit comprising, in combination: a hollow, tubular thin film of high permeability material having a direction of easy magnetization and having a non-linear B–H characteristic; means for applying a constant magnetic field to said material for biasing said material to a non-linear portion of said characteristic; a conductor threaded through said hollow film and insulated from said material; a winding having two sections linking said film in opposite sense to one another; means for applying to said conductor A.C. signals having a frequency $f$; and means connected to said winding to form a circuit resonant at a frequency $f/n$, where $n$ is an integer.

9. The combination comprising: a hollow, thin tubular film of high permeability material having an axis and a direction of easy magnetization, said material having a non-linear B–H characteristic; a plurality of separate, axially spaced windings linking said film; separate means connected with each of said windings to form a plurality of resonant circuits; an input winding threaded through said hollow film; and means for applying A.C. energizing signals to said input winding.

10. A parametric circuit comprising: a thin elongated member of high permeability material having a direction of easy magnetization; an input winding external to, and magnetically linking, said member; means for applying A.C. energizing signals having a frequency $f$ to said input winding; an output winding external to, and magnetically linking, said member; and means connected to said output winding to form a resonant circuit capable of oscillating parametrically at a subharmonic of said frequency $f$.

11. A parametric circuit comprising: a thin member of high permeability material having a direction of easy magnetization; first and second windings external to, and magnetically linking, said member, one of said windings having two sections connected in series opposition; means for applying A.C. signals having a frequency $f_1$ to the first of said windings; and means connected with the second of said windings to form a circuit having a natural frequency $f_0 \cong f_2$, where $f_1$ and $f_2$ are integrally related.

12. A parametric circuit comprising: a thin member of high permeability material having a direction of easy magnetization and a non-linear B–H characteristic; first and second windings external to, and magnetically linking, said member; means for applying A.C. signals having a frequency $f$ to one of said windings; means connected with the other of said windings to form a tank circuit capable of oscillating parametrically at a subharmonic of said frequency $f$; and means for applying a constant magnetic field to said material for biasing said material to a non-linear portion of said characteristic.

13. The combination comprising: a tubular thin member of high permeability material having an easy direction of magnetization; first and second conductors magnetically linking said member, one of said conductors being disposed within said tubular member; means connected to one of said conductors to form a circuit having a natural resonant frequency $f_0 \cong f$; and means for applying A.C. energizing signals having a frequency $nf$ to the other of said conductors, where $n$ is an integer.

14. The combination comprising: a thin strip of high permeability material wound in the form of a cylinder and having an easy direction of magnetization; first and second conductors magnetically linking said strip, one of said conductors being disposed within said cylinder; means connected to a first one of said conductors to form a circuit having a natural resonant frequency $f_0 \cong f$; and means for applying to the second one of said conductors A.C. energizing signals having a frequency $nf$, where $n$ is an integer.

References Cited

UNITED STATES PATENTS

| | | | |
|---|---|---|---|
| 2,697,178 | 12/1954 | Isborn | 307—88 |
| 2,792,563 | 3/1957 | Rajchman | 340—174 |
| 2,814,733 | 11/1957 | Lipkin | 307—88 |
| 2,883,604 | 4/1959 | Mortimer | 307—88 X |
| 2,945,217 | 7/1960 | Fisher et al. | 340—174 |
| 2,948,818 | 8/1960 | Goto | 307—88 |
| 3,051,891 | 8/1962 | Jorgensen | 307—88 |

OTHER REFERENCES

Publication I, Journal of Applied Physics, vol. 29, No. 3, March 1958, pp. 264–273.

Publication II, Electronic Design, vol. 7, No. 17, Aug. 19, 1959, pp. 42, 43.

BERNARD KONICK, *Primary Examiner.*

JOHN T. BURNS, JAMES W. MOFFITT, *Examiners.*

R. R. HUBBARD, *Assistant Examiner.*